United States Patent
Nakajima (10) Patent No.: US 7,403,305 B2
(45) Date of Patent: Jul. 22, 2008

(54) IMAGE PROCESSING SYSTEM, APPARATUS AND METHOD FOR UPDATING A PRINTER PROFILE BASED ON COMPARISON OF PREVIOUS AND CURRENT MEASUREMENTS OF COLOR CHART

(75) Inventor: Takehiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 976 days.

(21) Appl. No.: 10/662,667

(22) Filed: Sep. 15, 2003

(65) Prior Publication Data

US 2004/0114165 A1   Jun. 17, 2004

(30) Foreign Application Priority Data

Sep. 20, 2002  (JP) ............................. 2002-275934
Sep. 9, 2003   (JP) ............................. 2003-317404

(51) Int. Cl.
   *H04N 1/60*   (2006.01)
   *H04N 1/387*  (2006.01)
   *G03F 3/08*   (2006.01)

(52) U.S. Cl. ................... 358/1.9; 358/3.23; 358/518

(58) Field of Classification Search ................ 358/1.9, 358/504, 518, 1.15, 520, 523, 3.23
See application file for complete search history.

(56) References Cited

U.S. PATENT DOCUMENTS

| 5,107,332 | A | | 4/1992 | Chan |
| 5,739,927 | A | * | 4/1998 | Balasubramanian et al. .... 358/518 |
| 5,781,206 | A | | 7/1998 | Edge |
| 5,877,787 | A | | 3/1999 | Edge |
| 6,027,201 | A | | 2/2000 | Edge |
| 6,048,117 | A | | 4/2000 | Banton |
| 6,178,007 | B1 | * | 1/2001 | Harrington .................. 358/1.9 |
| 6,233,061 | B1 | * | 5/2001 | Huang et al. ................. 358/1.9 |
| 6,337,922 | B2 | * | 1/2002 | Kumada .................... 382/162 |
| RE38,180  | E  |   | 7/2003 | Edge |
| 6,870,636 | B2 | * | 3/2005 | Kulkarni .................... 358/1.9 |
| 6,950,197 | B1 | * | 9/2005 | Nakajima ................... 358/1.1 |
| 7,064,860 | B1 | * | 6/2006 | Balasubramanian et al. .. 358/1.9 |
| 2002/0039106 | A1 | * | 4/2002 | Shimada .................... 345/604 |
| 2002/0145744 | A1 | * | 10/2002 | Kumada et al. ............. 358/1.9 |

FOREIGN PATENT DOCUMENTS

| EP | 0398502 A2 | 11/1990 |
| EP | 0741491 A2 | 11/1996 |
| JP | 3-101378   | 4/1991  |
| JP | 2000-4369  | 1/2000  |
| JP | 2001-45313 | 2/2001  |
| JP | 2001-144976 | 5/2001 |

* cited by examiner

*Primary Examiner*—King Poon
*Assistant Examiner*—Peter L Cheng
(74) *Attorney, Agent, or Firm*—Cooper & Dunham, LLP (57) ABSTRACT

A feature amount converting unit performs a color conversion of an input data. A history storage unit stores history information about a measurement of a color chart including conversion values of measured values of the color chart. An arithmetic unit compares the history information with new input information for measurement of the color chart, and determines the number of color patches based on a result of the comparison. A profile updating unit updates a printer profile based on a determined color chart data, and stores the printer profile in the history storage unit.

33 Claims, 6 Drawing Sheets

IMAGE PROCESSING SYSTEM, APPARATUS AND METHOD FOR UPDATING A PRINTER PROFILE BASED ON COMPARISON OF PREVIOUS AND CURRENT MEASUREMENTS OF COLOR CHART

BACKGROUND OF THE INVENTION

1) Field of the Invention

The present invention relates to a technology for creating a printer profile.

2) Description of the Related Art

A conventional image processing apparatus obtains a desired printer output by converting an input color space into an output color space based on a method of processing as follows:

(1) converting color data included in image data input through a scanner or a monitor into the input color space based on a corresponding profile;

(2) equally dividing the input color space using a color lookup table (hereinafter "LUT") recorded in the profile corresponding to a printer;

(3) setting an output value at each peak of divided lattice points; and (4) converting the input color space into an output color space by obtaining the output color data using a predetermined method (e.g., interpolation) based on the output value stored at each peak that has a closest positional relation with the input color data in the divided lattice.

To obtain the output color space using the above method, it is required to create an appropriate printer profile. To create a printer profile, it is necessary to perform calorimetric processing by outputting a color chart including an extremely larger number of color patches than that of a target printer. As a result, the operation of creating the printer profile produces quite a load on processing resources.

To cope with the problem, Japanese Patent Application Laid Open No. 2001-045313 discloses a technology of storing a compensation profile corresponding to a combination of a printing profile and a printer profile separately from the printing profile and the printer profile so that an increase in memory capacity is suppressed when data is stored, and performing a color conversion to obtain a color-matching proof image with a high precision.

Japanese Patent Application Laid Open No. 2001-144976 discloses a technology of selecting an appropriate table from a plurality of existing profiles (tables) based on evaluation using dot gain or the like, and creating a new profile based on the table and colorimetric data for a color chart having a less number of patches.

Furthermore, Japanese Patent Application Laid Open No. 2000-004369 discloses a technology of performing a test image display and a printer output, comparing the color of the displayed image with the color of the printed image, compensating a particular color that does not match each other by referring to a history, and storing corrected output values at the lattice points in an output device profile.

Besides the above disclosures, Japanese Patent Application Laid Open No. 2001-144976 makes it possible to create a profile with a less number of color patches by taking the amount of dot gain as an evaluation standard. However, since a position of an arbitrary color on a recording medium is unchanged, that is, a position of creating a patch is fixed according to an application, a position to be measured is also the same, and even if a state of another position with no patch is changed, it is not possible to respond to the change. In addition, since a patch output at an output position is fluctuated for each representative color (e.g., R, G, B, C, M, Y), colors largely depend on a state of a printer. It is a common problem in the conventional technologies including the above example of disclosures.

SUMMARY OF THE INVENTION

It is an object of the present invention to solve at least the problems in the conventional technology.

The image processing apparatus according to one aspect of the present invention includes a converting unit that performs color conversion of input data, which is color data obtained from measurement of a color chart of an image, a storage unit that stores the conversion data and history information on the measurement of the color chart, an arithmetic unit that compares the history information with information on the measurement of the color chart to determine number of color patches, and an updating unit that updates the printer profile based on the number of color patches.

The image processing system according to another aspect of the present invention includes a server that updates a printer profile based on color data obtained from measurement of a color chart of an image, and a client that is connected to the server. The server includes a converting unit that performs color conversion of the color data to produce conversion data, a storage unit that stores the conversion data and history information on the measurement of the color chart, an arithmetic unit that compares the history information with information on the measurement of the color chart to determine number of color patches, and an updating unit that updates the printer profile based on the number of color patches. The client includes a profile storage unit that stores a printer profile created by the server, and a printer driver that converts input color data received from an application into output color data that can be interpreted by an image forming apparatus.

The image forming apparatus according to still another aspect of the present invention includes a converting unit that performs color conversion of input data, which is color data obtained from measurement of a color chart of an image, a storage unit that stores the conversion data and history information on the measurement of the color chart, an arithmetic unit that compares the history information with information on the measurement of the color chart to determine number of color patches, an updating unit that updates the printer profile based on the number of color patches, and an image forming unit that forms a visible image on a medium.

The method of image processing according to still another aspect of the present invention includes performing color conversion of input data, wherein the input data is color data obtained from measurement of a color chart of an image, storing the conversion data and history information on the measurement of the color chart, comparing the history information with information on the measurement of the color chart to determine number of color patches, and updating the printer profile based on the number of color patches.

The computer product according to still another aspect of the present invention realizes the methods according to the present invention on a computer.

The other objects, features and advantages of the present invention are specifically set forth in or will become apparent from the following detailed descriptions of the invention when read in conjunction with the accompanying drawings.

DETAILED DESCRIPTION

Exemplary embodiments of a method of and an apparatus for image processing, image processing system, and image forming apparatus according to the present invention are explained in detail below with reference to the accompanying drawings.

Figure 1:
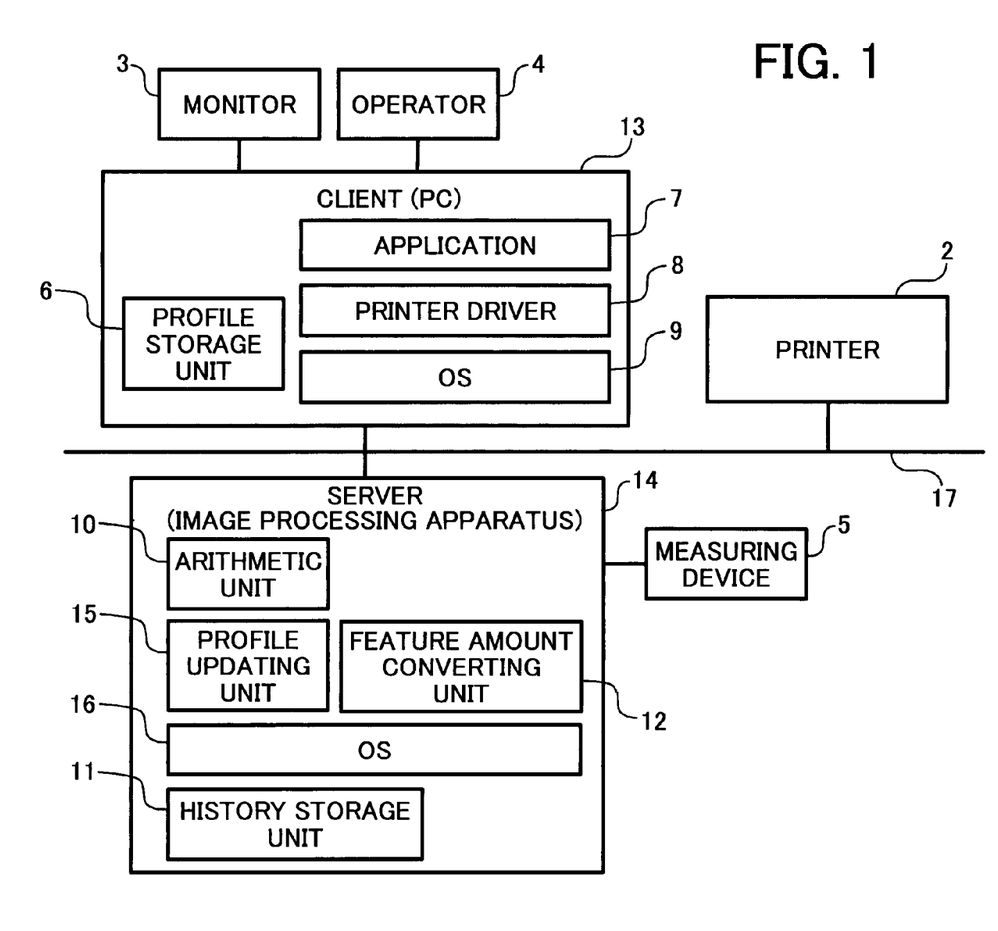
FIG. 1 is a block diagram of an image processing apparatus according to an embodiment of the present invention.

FIG. 1 is a block diagram of an image processing apparatus according to an embodiment of the present invention. The image processing system is constructed by connecting a server 14 (image processing apparatus) and a client (personal computer (PC)) 13 to a printer 2 through a network such as a local area network (LAN) 17. The server 14 performs arithmetic operation. The client 13 interfaces with a user and the printer 2.

The server 14 includes an arithmetic unit 10, a history storage unit 11, a feature amount converting unit 12, a profile updating unit 15, and an operating system (OS) 16. The server 14 is connected with a measuring device 5 for color patches.

The feature amount converting unit 12 stores a first LUT 202 (FIG. 2A) in advance. The arithmetic unit 10 compares previously measured values of a color chart in the history storage unit 11 with newly measured values of a color chart, and determines a number of color patches from the result of comparison.

The history storage unit 11 stores previously measured color patch values (L, a, b) 201 (FIG. 2A) in Lab coordinates and vector values 203 (FIG. 2A) which are obtained by compressing the three-dimensional Lab values 201 to one-dimensional values. This unit 11 corresponds to, for example, a hard disk drive (HDD) and a nonvolatile memory.

The profile updating unit 15 allows the printer to output a color chart including the number of patches determined by the arithmetic unit 10, re-loads the chart, updates the printer profile, and transmits the updated profile to the client 13.

The operating system (OS) 16 is, for example, Microsoft WINDOWS®, UNIX®, and LINUX®.

The feature amount converting unit 12 represents a converting unit in the present invention, the arithmetic unit 10 represents an arithmetic unit in the present invention, and the profile updating unit 15 represents an updating unit in the present invention. Further, the history storage unit 11 represents a storage unit in the present invention.

A program for generating a C language program executed on a C language program generating unit is recorded in a computer-readable recording medium and is provided. The recording medium includes a CD-ROM, floppy disk (FD), or DVD so that the program is recorded in the form of an installable format file or an executable format file.

Further, the program for generating the C language program may be stored on a computer connected to a network such as the Internet to be provided by allowing another computer to download it through the network. Alternatively, the program for generating the C language program may be provided or distributed through the network.

An image processing program operating on the server 14 of the embodiment is fetched from a recording medium and executed in the server 14 to load the program on a main storage device to thereby generate the feature amount converting unit 12, the arithmetic unit 10, and the profile updating unit 15 on the main storage device.

The image processing program is recorded in CD-ROM, DVD-ROM, or FD in the form of an installable or executable file format, and is provided. Such an image processing program may be provided through a network and further be provided to the outside through the network in the file format.

The client 13 includes an application 7, a profile storage unit 6, a printer driver 8, and an operating system (OS) 9. The client 13 is connected with a monitor 3 and an operator (operating unit) 4.

The application 7 is, for example, a word processor or an application for performing spreadsheet calculation, and sends data such as a document created by the application 7 to the printer driver 8 using a print command.

The printer driver 8 receives input color data (e.g., red (R), green (G), and blue (B)) from the application 7, converts the data to data in a format so that the printer 2 can interpret, and transmits the converted data. The data conversion is performed by referring to an N-dimensional LUT (N, number of dimensions of an input color space) in the profile stored in the profile storage unit 6 of the client 13. The N-dimensional LUT is created in the server 14, and the profile includes the LUTs corresponding to a number of elements of output data. In other words, one of the LUTs is expressed by coordinates of L, a, and b represented by three-dimensional Lab values, i.e., a Lab color space.

The OS 9 is, for example, Microsoft WINDOWS®, UNIX®, and LINUX®.

The profile storage unit 6 stores a printer profile received from the server 14, and an HDD or a nonvolatile memory serves as the unit 6.

The server 14 and the client 13 according to the embodiment are connected with a control device such as CPU, a recording device such as HDD, a storage device such as RAM and a nonvolatile memory, and a communication device such as a network board, which is an ordinary configuration using a computer.

The example shown in FIG. 1 has the server 14 and the client 13 as discrete units, but one unit of personal computer may include both of the functions. Alternatively, the structure may support a so-called meta frame environment such that the server 14 has the application and the printer driver 8 and the client 13 downloads the application and printer driver 8 only when using them.

Figure 2A:
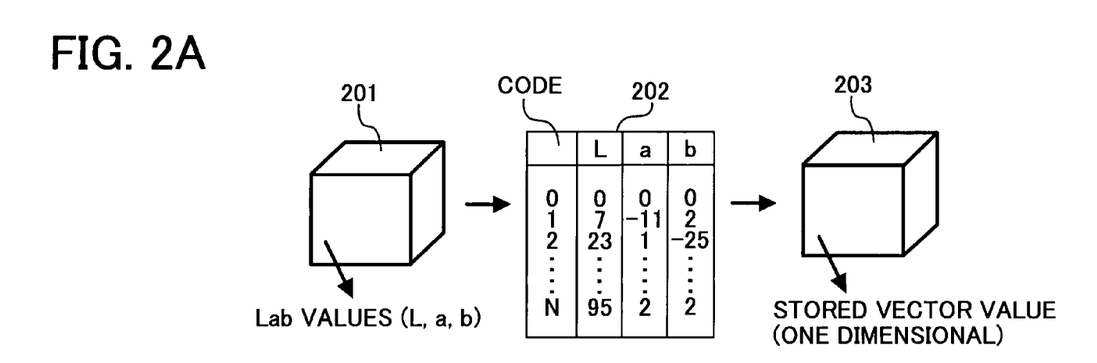
FIG. 2A and FIG. 2B illustrate how to create data to be stored in the history storage unit in a server.

FIG. 2A and FIG. 2B illustrate how to create data to be stored in the history storage unit 11 of the server 14. The history storage unit 11 stores previously measured color patch values (L, a, b) 201 in Lab coordinates as shown in FIG. 2A. The one-dimensionally compressed vector value 203 are obtained by performing arithmetic in the arithmetic unit 10 on three-dimensional Lab values 201 using the first LUT 202 in the feature amount converting unit 12, and the vector value is stored in the history storage unit 11. The first LUT 202 is a table prepared in advance, and is set as a reference, and therefore, this table is not possibly rewritten. The vector value 203 is used for determining Lab values at the time of creating patches.

If a vector is quantized to compress vector information, the number of representative vectors becomes $2^c$ where c is a division number of space (a number of hierarchies in binary trees). A one-dimensional vector code value $2^{(c-1)}$ obtained by dividing the space by (c−1) times represents an average value of one-dimensional vector code values $2^{c-1}$ and $2^c$ in a low hierarchy (divided by c times). Therefore, if the one-dimensional vector code value $2^{(c-1)}$ expresses a blue type color, a vector code value in the low hierarchy expresses a bluish green type color or a bluish purple type color.

Figure 2B:
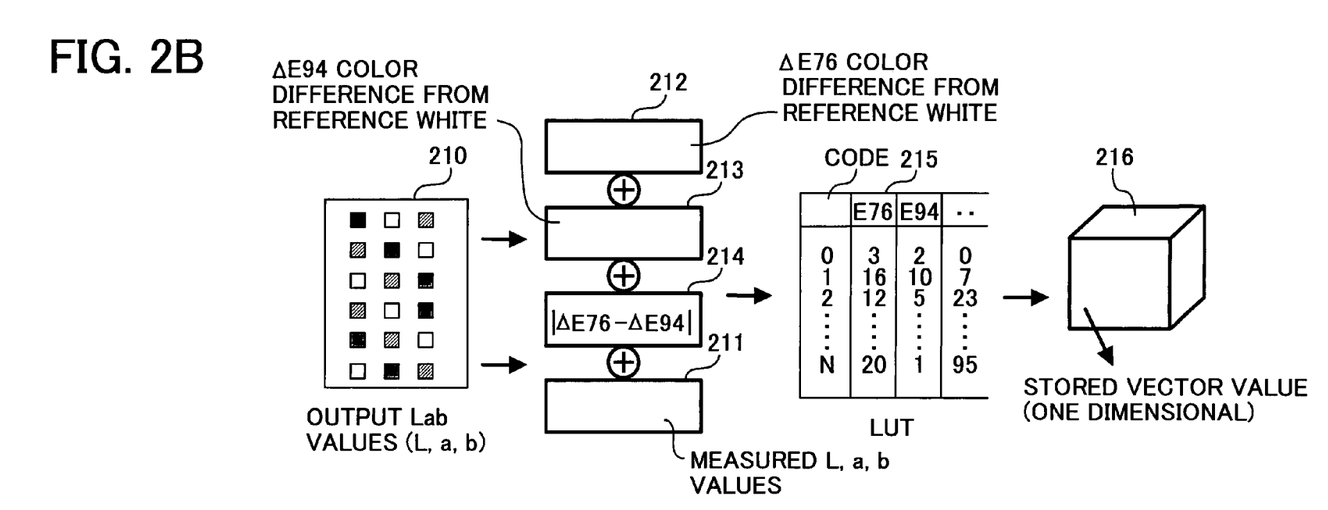

As shown in FIG. 2B, each distance (or color difference) between Lab values 211 obtained by measuring output color patches 210 and Lab values of reference white (e.g., paper white) of a medium for printing, is obtained. At this time, a distance 212 as ΔE76 ("ΔE76 distance") is calculated by the color difference formula according to the CIE1976Lab color system (CIE, Commission Internationale de L'Eclairage, International Commission on Illumination), and a distance 213 as ΔE94 ("ΔE94 distance") is calculated by the CIE1994 color difference formula. Further, a difference ("distance between color differences") 214 between the ΔE76 distance and the ΔE94 distance is obtained to allow detailed characteristics of a target color to be acquired in a numerical form. Subsequently, an N-dimensional input vector is converted to a one-dimensional vector value 216 using a second conversion table LUT 215 in the feature amount converting unit 12. At this time, the number N of dimensions of an input vector is 3 (N=3) if only the ΔE76 distance 212, the ΔE94 distance 213, and the distance 214 between the color differences are combined. Further, N=6 if the Lab measured values 211 are combined with ΔE76 distance 212, the ΔE94 distance 213, and the distance 214 between the color differences.

Conversion of N-dimensional data to one-dimensional data is performed using the first and second LUTs 202 and 215. The first and second LUTs 202 and 215 are prepared by using a large amount of sample data when the system is constructed, and include codes indicating values at lattice points and vector values representing the codes. For both input and output, the number of one-dimensional representative vectors is a number of lattice points in an N-dimensional cube in the profile. Assuming the number of division of a color to be presented is n, the number of representative vectors is $n^3$. As the first LUT 202 is used also for creating the profile, the number of representative vectors stands at $n^3$. However, in order to reduce the load to the server 14, it is preferred that the second LUT 215 prepare representative vectors created with a smaller number than $n^3$ (e.g., $(n/2)^3$, $(n/4)^3$).

Figure 3:
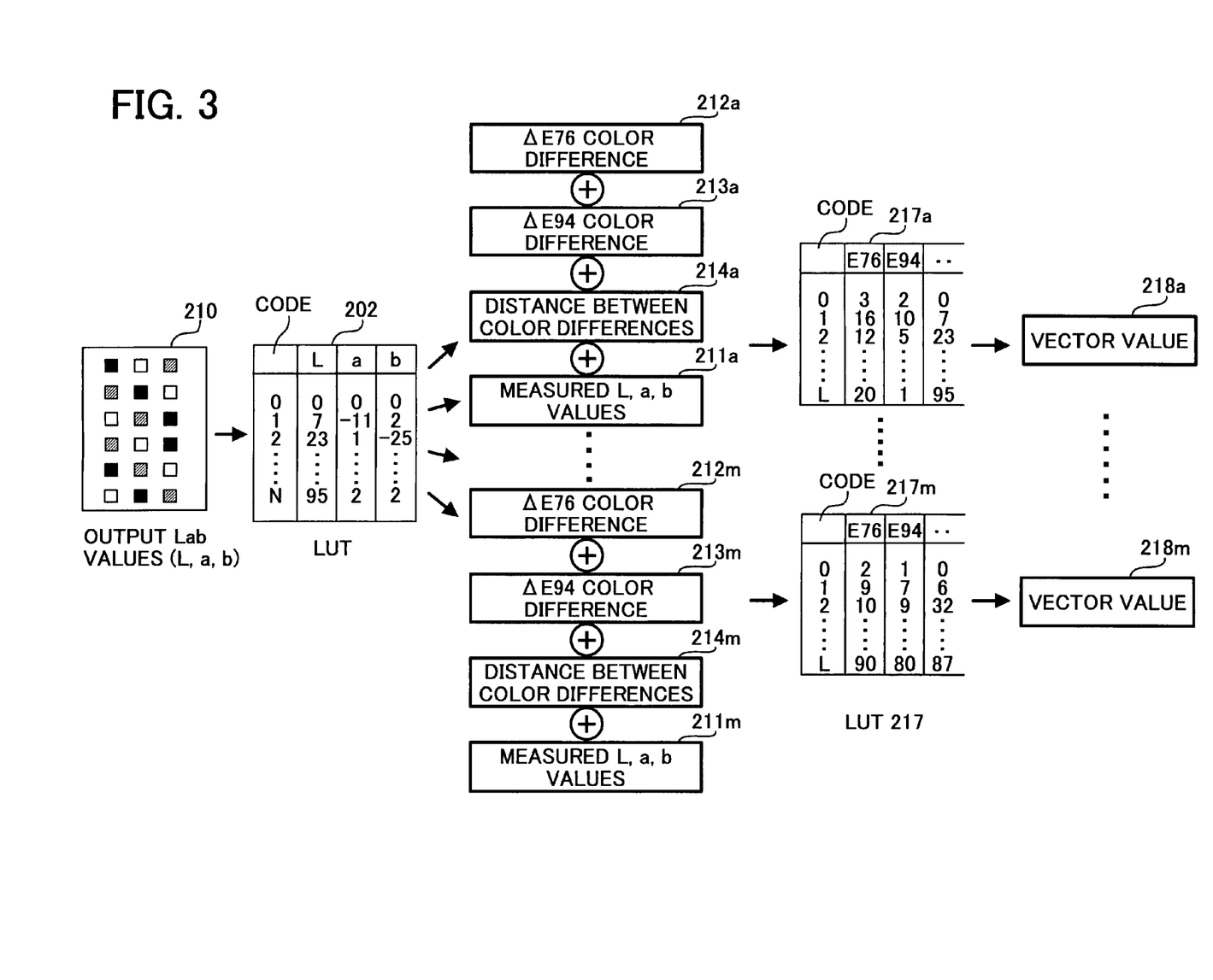
FIG. 3 illustrates how to create data to be stored in the history storage unit when a representative color is used.

A third LUT 217 (217a ... 217m) uses vectors after the vectors are expressed as neighborhoods of representative colors using the first LUT 202 as shown in FIG. 3. By using the vectors, even if the number of elements in the LUT is reduced (N>L), vector values 218a ... 218m are obtained for L units of elements as shown in the LUT 217, thus, achieving high precision. That is, the third LUTs 217a ... 217m are prepared in advance for lattice points near the representative colors, and any of the processing 211a, 212a, 213a, 214a, ... 211m, 212m, 213m, and 214m corresponding to neighbor colors of the representative color is executed without executing the processing to all the neighbor colors of the representative colors as shown in FIG. 2B, and conversion may be performed using any of the LUTs 217a through 217m corresponding to the processing. Therefore, the processing load becomes lighter to obtain high speed processing. Further, as the range of colors is narrowed, correction with higher precision becomes possible.

Figure 4:
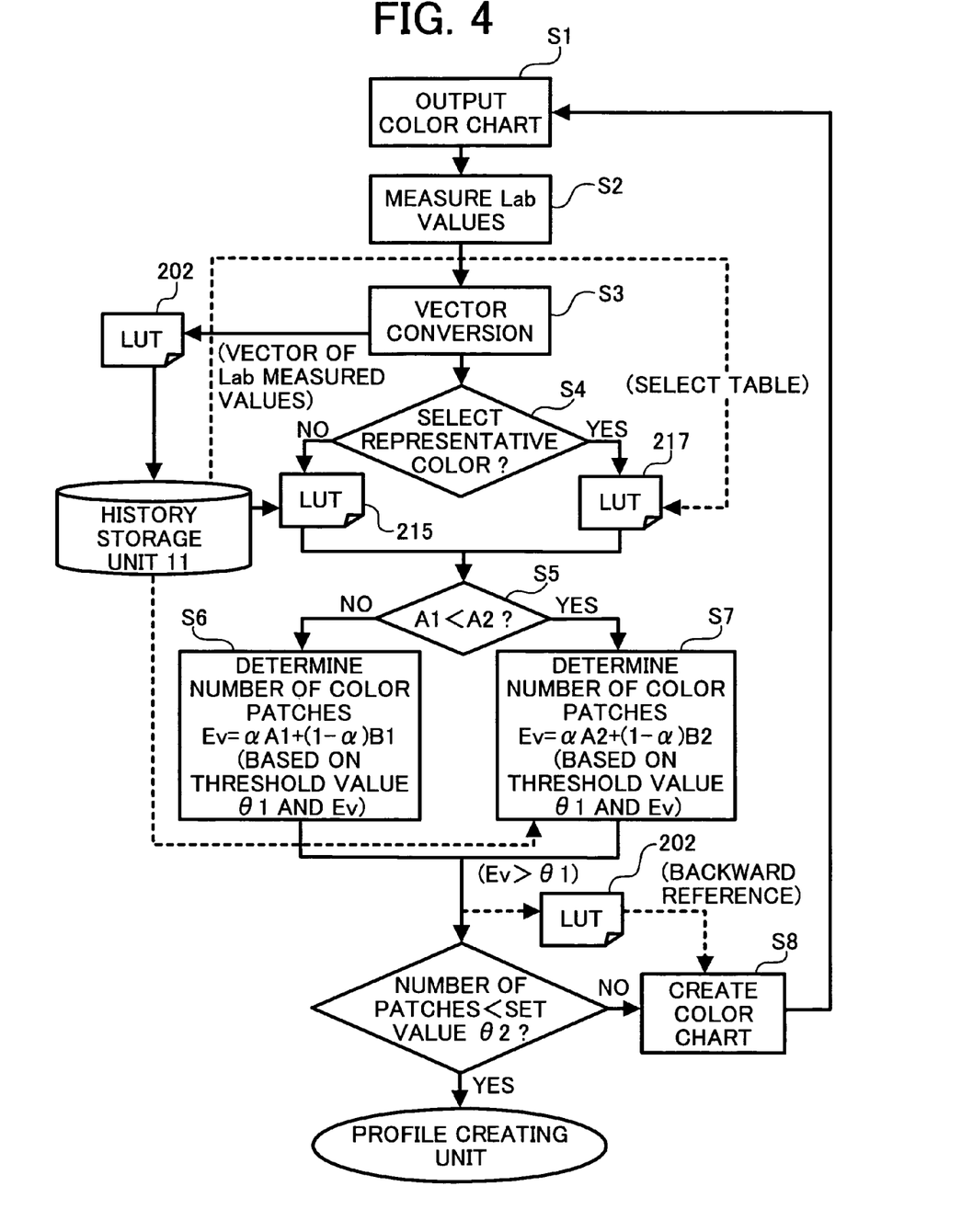
FIG. 4 is a flowchart of creating a color chart (patches) in which a number of color patches and a color region are optimized.

FIG. 4 is a flowchart of creating a color chart (patches) in which a number of color patches and a color region are optimized.

When the color chart with the optimized number of color patches and color region is to be created, a color chart as a reference for optimizing the number of patches is output from the printer 2 (step S1), Lab values of the color patches 210 in the color chart are measured by a measuring device 5 (step S2). At this time, the number of patches in the color chart is set to the same or a smaller number of representative vectors in the LUT 202. The ΔE76 distance 212, the ΔE94 distance 213, and the distance 214 between the color differences are obtained by the arithmetic unit 10 to combine them as a vector (step S3).

When an instruction to measure only a representative color (e.g., R, G, B, C M, Y) is received from the user (step S4, Yes), the most recently measured results are loaded from the history storage unit 11 to extract a plurality pieces of data close to the representative vector indicating the representative color from any of the third LUTs 217a to 217m.

After extraction, an N-dimensional vector is converted to a one-dimensional vector based on any of the third LUTs 217a, to 217m, and the one-dimensional vector is stored in the history storage unit 11. If no instruction is received from the user (step S4, No), the N-dimensional vector is converted to the one-dimensional vector for the entire data corresponding to the whole color regions constituting the most recently updated profile, based on the second LUT 215, and the one-dimensional vectors are stored in the history storage unit 11.

After storage of the data, a difference between the N-dimensional vector and the representative vector is calculated and the difference is sent to the arithmetic unit 10. Subsequently, the last vector value is extracted from the history storage unit 11 to determine the number of color patches.

There are two stages for evaluation of patches created for the next color chart. At the first stage, an error ("A1") is compared with an error ("A2") (step S5). The error A1 is between the vector of the previously measured result and the vector of the newly measured result, and the error A2 is between the representative vector indicating an average value of measured values and the vector of the newly measured result. Specifically, A1 is the evaluation standard including short-term characteristics of the printer based on the last-measured values and the newly measured values, and A2 is the evaluation standard including long-term characteristics of the printer based on the average value of a large number of samples and the newly measured value. If A1 is greater than or equal to A2 (step S5, No), the patch measurement made just prior to the last measurement and the newly measured result is loaded from the history storage unit 11 to calculate a difference ("B1") between the result the time before last and the newly measured result, and the following equation is determined as the evaluation standard Ev (step S6), $$Ev = \alpha A1 + (1-\alpha)B1.$$

If A1 is smaller than A2 (step S5, Yes), the measured value having the smallest difference with the representative vector is loaded from the history storage unit 11 to calculate a difference ("B2") between the measured value and the newly measured result, and the following equation is determined as the evaluation standard Ev (step S7), $$Ev = \alpha A2 + (1-\alpha)B2$$

where α is a coefficient and is generally 0.5, but the coefficient can be varied according to the state of the printer.

If the conditions of the color regions for the last and current measurements do not match (for example, during the last measurement, patches cover the whole color regions, and for the current measurement, patches cover only the representative color region), the current condition is preferentially selected, and lack of data is covered by extracting the data from the history storage unit 11 to obtain the error.

Only when Ev as the evaluation standard is greater than a threshold value θ1 for determination of patch output (Ev>θ1), the target Lab values are stored for patch creation (step S8). After the processing for determining the threshold value is finished, the Lab values for the patch creation are obtained by use of backward reference to the first LUT 202 to change the Lab values according to an Ev value, patches are randomly created and arranged in a color chart, and then the color chart is output from the printer 2 and the patches are measured again (step S8→step S1). By randomly creating and arranging the patches in the above manner, the colors and the position of arranging the color patches can arbitrarily be changed, and the color patches created at the changed positions are measured. Therefore, any change of the color patches can be followed.

When the selection and arrangement of the color patches is predetermined as in the conventional technology, a change in a color which does not correspond to one of the predetermined patches cannot be followed. However, by performing such processing, the change becomes no longer a significant matter. It is noted that the position of forming the color patches is set on the side closer to the edge part of the photoreceptor if the Ev value is small, and is set on the side closer to the central part thereof if it is great. Consequently, the position of forming the color patches can be set according to the Ev value, and a combination of the setting of the position and the change in the number of color patches is highly adaptable to any of the changes.

Even if the number of color patches is to be changed, the position of forming the color patches is also changed, and therefore, any of the changes can be followed even if the position is changed not based on the Ev value.

The number of patches to be created is determined at a point in time when the number of patches becomes smaller than a threshold value θ2 of patches (step S9). After measurement and creation of the patches are finished, a profile creating unit creates a profile by weighting the evaluation-standard value Ev. The threshold value θ2 is set by the user or set based on the threshold value θ1 for determination on the patch output.

Figure 5:
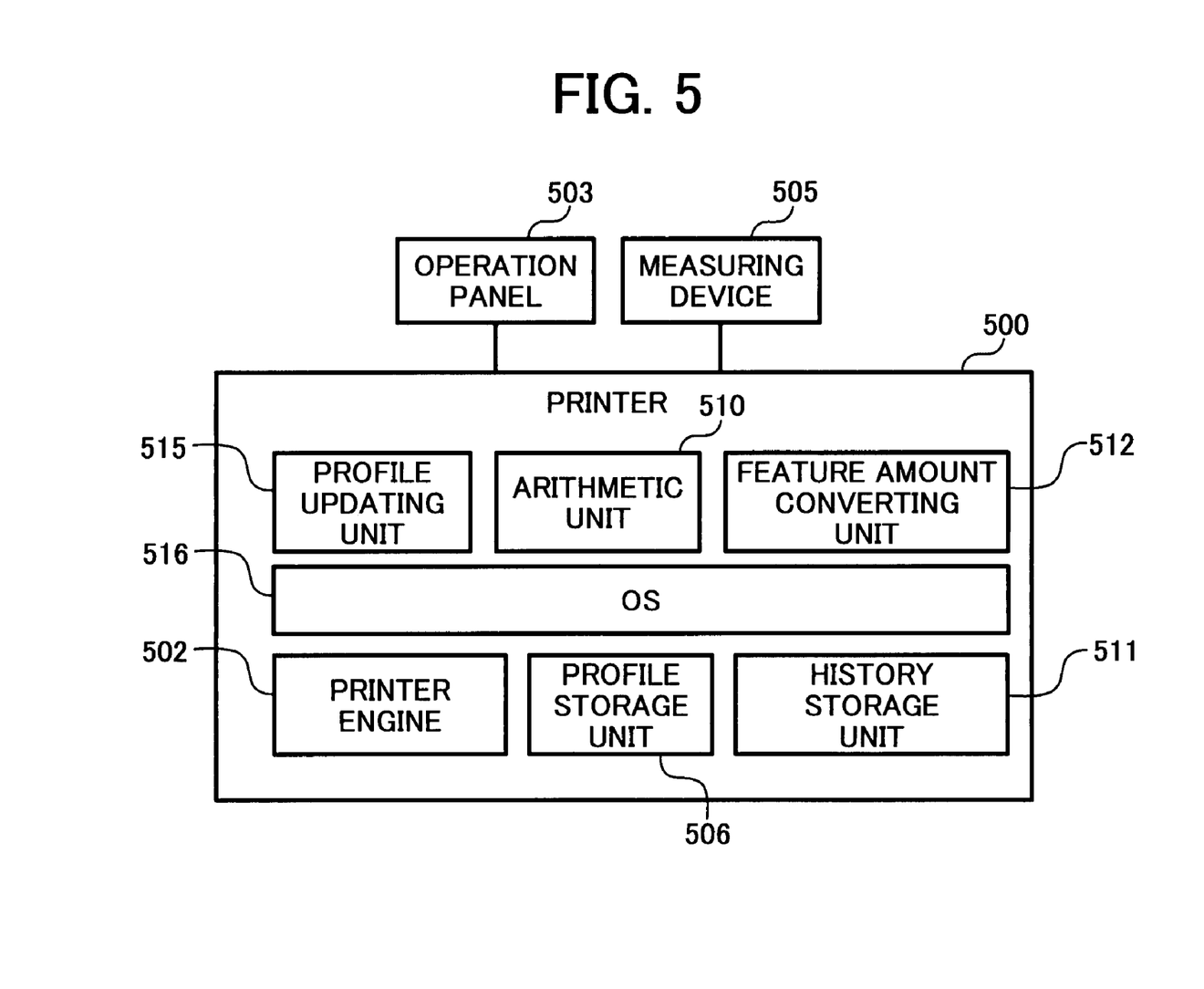
FIG. 5 is a block diagram of an image forming apparatus according to a modification of the embodiment.

The server 14, the client 13, and the printer 2 form the image processing system as shown in FIG. 1. However, as shown in FIG. 5, a profile updating unit 515, an arithmetic unit 510, a feature amount converting unit 512, an OS 516, a profile storage unit 506, a history storage unit 511, and a printer engine 502 that executes printing, can be formed as one unit, or can be formed as one printer 500 (image forming apparatus) by accommodating the components in one casing. In this case, the profile updating unit 515, arithmetic unit 510, feature amount converting unit 512, profile storage unit 506, and the history storage unit 511 have the same functions as those in the units shown in FIG. 1. Further, the printer 500 is connected with an operation panel 503 and a measuring device 505.

Figure 6:
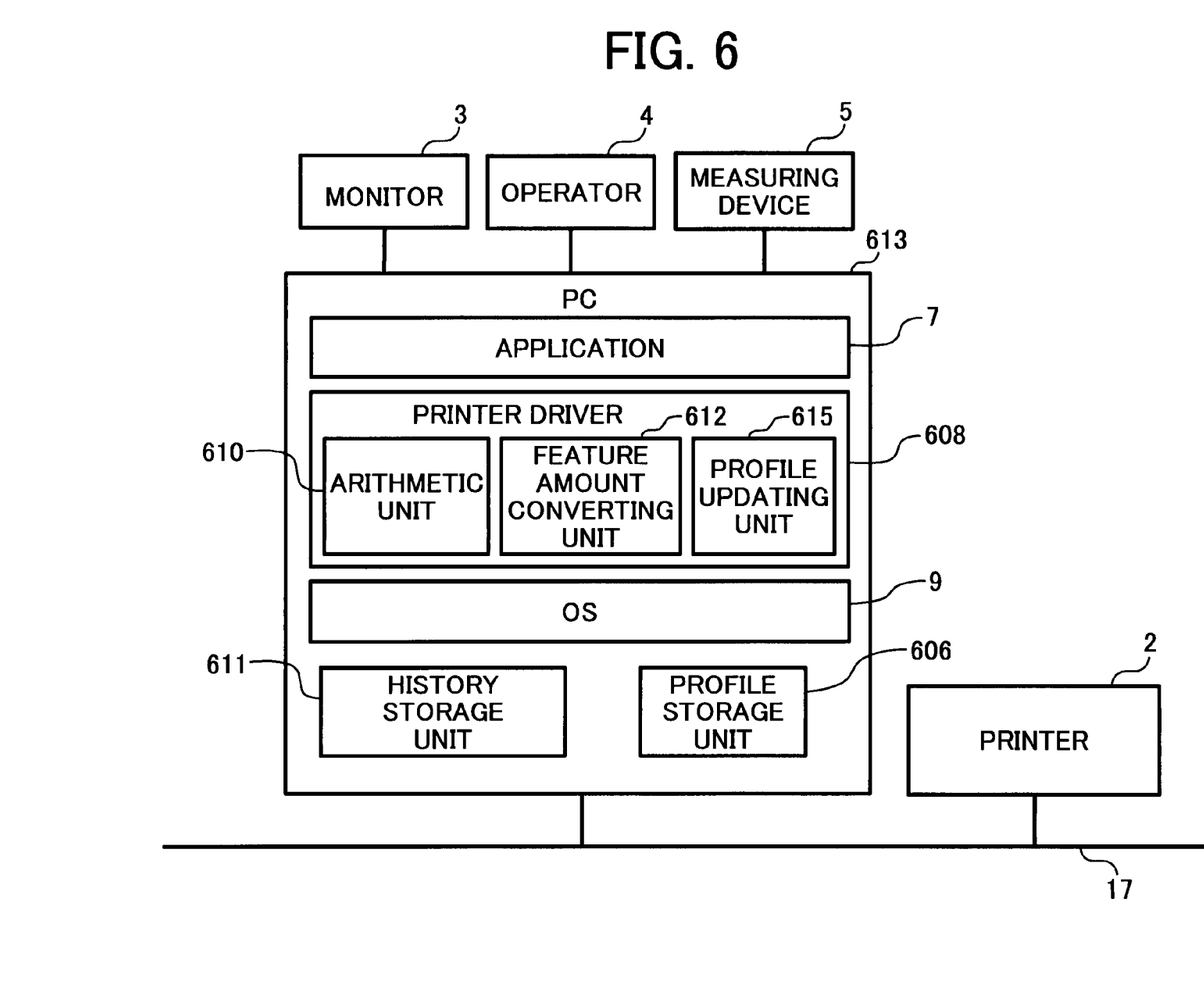
FIG. 6 is a block diagram of a personal computer according to another modification of the embodiment.

As shown in FIG. 6, a printer driver 608 of PC 613 may include a profile updating unit 615, an arithmetic unit 610, and a feature amount converting unit 612. Further, an HDD or a nonvolatile memory may include a profile storage unit 606 and a history storage unit 611.

As explained above, according to the embodiment, an error at the time of compressing information is obtained based on the history information and representative vector and the new information to determine the error as an evaluation standard. It is, thereby, possible to control the number of patches of the color chart and create a printer profile with high precision. The printer profile includes short-term characteristics of the printer such as characteristics obtained by detecting the number of positions of the color patches, and long-term characteristics such as history information stored in the history storage. Further, the color region is divided based on Lab distances as a reference to enable selection of a quantitative representative color, and creation and correction of the profile according to the user's purpose.

It is noted that the sequence shown in FIG. 4 can be provided as a computer program.

As explained above, according to the present invention, it is possible to optimize the number of color patches when the color chart (patches) is measured.

Further, by changing the number of color patches, arrangement of the patches is changed. Therefore, the position of forming the color patches is prevented from being fixed regardless of any applications, which makes it possible to adapt to changes in the printer over time.

The present document incorporates by reference the entire contents of Japanese priority documents, 2002-275934 filed in Japan on Sep. 20, 2002 and 2003-317404 filed in Japan on Sep. 9, 2003.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
a converting unit that performs color conversion of input data, wherein the input data is color data obtained from previous measurement of a color chart of an image;
a storage unit that stores the conversion data and history information of the previous measurement of the color chart;
an arithmetic unit that compares the history information with information of new measurement of the color chart to determine number of color patches; and
an updating unit that updates a printer profile based on the number of color patches,
wherein the arithmetic unit determines the number of color patches based on an evaluation standard, wherein the evaluation standard includes a newly measured patch value and an average of patch values previously measured and stored as the history information.

2. The image processing apparatus according to claim 1, wherein the history information of the previous measurement of the color chart includes the color data, number of times of the measurement, and color regions at the time of the previous measurement.

3. The image processing apparatus according to claim 1, wherein the converting unit includes a table for converting multi-dimensional Lab values into one-dimensional vector values.

4. The image processing apparatus according to claim 1, wherein the evaluation standard is a predetermined value obtained for each neighborhood of whole color regions that constitute a profile.

5. The image processing apparatus according to claim 4, wherein the evaluation standard is a value obtained by combining a first distance, a second distance, and a third distance obtained for each neighborhood of the whole color regions, wherein the first distance is a distance between Lab values obtained from measuring the color patch and Lab values obtained from a reference white of an output medium, based on a color difference formula according to CIE1976Lab color system, the second distance is a distance between the Lab values obtained from measuring the color patch and the Lab values obtained from the reference white, based on a color difference formula according to CIE1994 color difference system, and the third distance is a difference between the first distance and the second distance.

6. The image processing apparatus according to claim 5, further comprising a compressing unit that compresses the combined value.

7. The image processing apparatus according to claim 6, wherein the compressing unit compresses the combined value by vector quantization.

8. The image processing apparatus according to claim 6, wherein the storage unit stores the compressed value.

9. The image processing apparatus according to claim 6, wherein the evaluation standard includes a reference vector for the compression of the combined value and an error occurring when the combined value is compressed.

10. The image processing apparatus according to claim 1, wherein the evaluation standard is a predetermined value obtained for each neighborhood of representative colors including preset colors that constitute a profile.

11. The image processing apparats according to claim 10, wherein the evaluation standard is a value obtained by combining a first distance, a second distance, and a third distance obtained for each neighborhood of the representative colors, wherein the first distance is a distance between Lab values obtained from measuring the color patch and Lab values obtained from a reference white of an output medium, based on a color difference formula according to CIE1976Lab color system, the second distance is a distance between the Lab values obtained from measuring the color patch and the Lab values obtained from the reference white, based on a color difference formula according to CIE1994 color difference system, and the third distance is a difference between the first distance and the second distance.

12. The image processing apparatus according to claim 11, wherein the representative colors are red, green, black, cyan, magenta, and yellow.

13. The image processing apparatus according to claim 11, further comprising a compressing unit that compresses the combined value.

14. The image processing apparatus according to claim 13, wherein the compressing unit compresses the combined value by vector quantization.

15. The image processing apparatus according to claim 13, wherein the storage unit stores the compressed value.

16. The image processing apparatus according to claim 13, wherein the evaluation standard includes a reference vector for the compression of the combined value and an error occurring when the combined value is compressed.

17. An image processing apparatus comprising:
a converting unit that performs color conversion of input data, wherein the input data is color data obtained from previous measurement of a color chart of an image;
a storage unit that stores the conversion data and history information of the previous measurement of the color chart;
an arithmetic unit that compares the history information with information of new measurement of the color chart to determine number of color patches; and
an updating unit that updates a printer profile based on the number of color patches, wherein
the arithmetic unit compares a first difference with a second difference, wherein
the first difference is a difference between a newly measured patch value and a patch value measured last time and stored as the history information, and
the second difference is a difference between the newly measured patch value and an average value of the patch values previously measured and stored as the history information, and
when the first difference is equal to or greater than the second difference, the arithmetic unit determines the number of color patches based on a third difference, wherein the third difference is a difference between the newly measured patch value and a patch value measured last but one.

18. An image processing apparatus comprising:
a converting unit that performs color conversion of input data, wherein the input data is color data obtained from previous measurement of a color chart of an image;
a storage unit that stores the conversion data and history information of the previous measurement of the color chart;
an arithmetic unit that compares the history information with information of new measurement of the color chart to determine number of color patches; and
an updating unit that updates a printer profile based on the number of color patches, wherein
the arithmetic unit compares a first difference with a second difference, wherein
the first difference is a difference between a newly measured patch value and a patch value measured last time and stored as the history information, and
the second difference is a difference between the newly measured patch value and an average value of the patch values previously measured and stored as the history information, and
when the first difference is less than the second difference, the arithmetic unit determines the number of color patches based on a third difference, wherein the third difference is a difference between the newly measured patch value and a measured patch value having a minimum difference from a representative vector indicating a representative color.

19. An image processing system comprising:
a server that updates a printer profile based on color data obtained from previous measurement of a color chart of an image; and
a client that is connected to the server, wherein
the server includes
a converting unit that performs color conversion of the color data to produce conversion data;
a storage unit that stores the conversion data and history information of the previous measurement of the color chart;
an arithmetic unit that compares the history information with information of new measurement of the color chart to determine number of color patches; and
an updating unit that updates the printer profile based on the number of color patches, and
the client includes
a profile storage unit that stores the printer profile; and a printer driver that converts input color data received from an application into output color data that can be interpreted by an image forming apparatus, wherein the arithmetic unit determines the number of color patches based on an evaluation standard, wherein the evaluation standard includes a newly measured patch value and an average of patch value; previously measured and stored as the history information.

20. The image processing system according to claim 19, further comprising a measuring unit that measures the color chart to obtain Lab values, and outputs the Lab values to the client.

21. An image forming apparatus comprising:
a converting unit that performs color conversion of input data, wherein the input data is color data obtained from previous measurement of a color chart of an image;
a storage unit that stores the conversion data and history information of the previous measurement of the color chart;
an arithmetic unit that compares the history information with information of new measurement of the color chart to determine number of color patches;
a profile storage unit that stores a printer profile;
an updating unit that updates the printer profile based on the number of color patches; and
an image forming unit that forms a visible image on a medium,
wherein the arithmetic unit determines the number of color patches based on an evaluation standard, wherein the evaluation standard includes a newly measured patch value and an average of patch values previously measured and stored as the history information.

22. An image processing method comprising:
performing color conversion of input data, wherein the input data is color data obtained from previous measurement of a color chart of an image;
storing the conversion data and history information of the previous measurement of the color chart;
comparing the history information with information of new measurement of the color chart to determine number of color patches; and
updating a printer profile based on the number of color patches,
wherein the number of color patches is determined based on an evaluation standard, wherein the evaluation standard includes a newly measured patch value and an average of patch values previously measured and stored as the history information.

23. The method according to claim 22, wherein the evaluation standard is a predetermined value obtained for each neighborhood of whole color regions that constitute a profile.

24. The method according to claim 23, wherein the evaluation standard is a value obtained by combining a first distance, a second distance, and a third distance obtained for each neighborhood of the whole color regions, wherein
the first distance is a distance between Lab values obtained from measuring the color patch and Lab values obtained from a reference white of an output medium, based on a color difference formula according to CIE1976Lab color system,
the second distance is a distance between the Lab values obtained from measuring the color patch and the Lab values obtained from the reference white, based on a color difference formula according to CIE1994 color difference system, and
the third distance is a difference between the first distance and the second distance.

25. The method according to claim 24, further comprising compressing the combined value.

26. The method according to claim 25, wherein the evaluation standard includes a reference vector for the compression of the combined value and an error occurring when the combined value is compressed.

27. The method according to claim 22, wherein the evaluation standard is a predetermined value obtained for each neighborhood of representative colors including preset colors that constitute a profile.

28. The method according to claim 27, wherein the evaluation standard is a value obtained by combining a first distance, a second distance, and a third distance obtained for each neighborhood of the representative colors, wherein
the first distance is a distance between Lab values obtained from measuring the color patch and Lab values obtained from a reference white of an output medium, based on a color difference formula according to CIE1976Lab color system,
the second distance is a distance between the Lab values obtained from measuring the color patch and the Lab values obtained from the reference white, based on a color difference formula according to CIE1994 color difference system, and
the third distance is a difference between the first distance and the second distance.

29. The method according to claim 28, further comprising compressing the combined value.

30. The method according to claim 29, wherein the evaluation standard includes a reference vector for the compression of the combined value and an error occurring when the combined value is compressed.

31. An image processing method comprising:
performing color conversion of input data, wherein the input data is color data obtained from previous measurement of a color chart of an image;
storing the conversion data and history information of the previous measurement of the color chart;
comparing the history information with information of new measurement of the color chart to determine number of color patches; and
updating a printer profile based on the number of color patches,
wherein the comparing includes
comparing a first difference with a second difference, wherein
the first difference is a difference between a newly measured patch value and a patch value measured last time and stored as the history information, and
the second difference is a difference between the newly measured patch value and an average value of the patch values previously measured and stored as the history information; and
determining the number of color patches based on a third difference, when the first difference is equal to or greater than the second difference, wherein the third difference is a difference between the newly measured patch value and a patch value measured last but one.

32. An image processing method comprising:
performing color conversion of input data, wherein the input data is color data obtained from previous measurement of a color chart of an image;
storing the conversion data and history information of the previous measurement of the color chart;
comparing the history information with information of new measurement of the color chart to determine number of color patches; and updating a printer profile based on the number of color patches, wherein the comparing includes comparing a first difference with a second difference, wherein the first difference is a difference between a newly measured patch value and a patch value measured last time and stored as the history information, and the second difference is a difference between the newly measured patch value and an average value of the patch values previously measured and stored as the history information; and determining the number of color patches based on a third difference, when the first difference is less than the second difference, wherein the third difference is a difference between the newly measured patch value and a measured patch value having a minimum difference from a representative vector indicating a representative color.

33. A computer readable medium tangibly embodying a program of instructions executable by a computer to perform a method comprising:

performing color conversion of input data, wherein the input data is color data obtained from previous measurement of a color chart of an image;

storing the conversion data and history information of the previous measurement of the color chart;

comparing the history information with information of new measurement of the color chart to determine number of color patches; and updating a printer profile based on the number of color patches, wherein the number of color patches is determined based on an evaluation standard, wherein the evaluation standard includes a newly measured patch value and an average of patch values previously measured and stored as the history information.

* * * * *